United States Patent
Malaescu et al.

(10) Patent No.: US 11,776,319 B2
(45) Date of Patent: Oct. 3, 2023

(54) METHODS AND SYSTEMS TO PREDICT ACTIVITY IN A SEQUENCE OF IMAGES

(71) Applicant: FotoNation Limited, Galway (IE)

(72) Inventors: Alexandru Malaescu, Bucharest (RO); Dan Filip, Bucharest (RO); Mihai Ciuc, Bucharest (RO); Liviu-Cristian Dutu, Bucharest (RO); Madalin Dumitru-Guzu, Bucharest (RO)

(73) Assignee: FotoNation Limited

( * ) Notice: Subject to any disclaimer, the term of this patent is extended or adjusted under 35 U.S.C. 154(b) by 96 days.

(21) Appl. No.: 16/929,051

(22) Filed: Jul. 14, 2020

(65) Prior Publication Data

US 2022/0019776 A1 Jan. 20, 2022

(51) Int. Cl.
*G06V 40/20* (2022.01)
*G06T 7/00* (2017.01)
*G06V 10/75* (2022.01)
*G06V 20/30* (2022.01)
*G06V 20/13* (2022.01)

(Continued)

(52) U.S. Cl.
CPC ............ *G06V 40/20* (2022.01); *G06F 18/214* (2023.01); *G06F 18/2113* (2023.01); *G06F 18/22* (2023.01); *G06T 7/97* (2017.01); *G06V 10/751* (2022.01); *G06V 20/13* (2022.01); *G06V 20/30* (2022.01)

(58) Field of Classification Search
CPC ...... G06V 40/20; G06V 10/751; G06V 20/13; G06V 20/30; G06K 9/6215; G06K 9/623; G06K 9/6256; G06T 7/97
See application file for complete search history.

(56) References Cited

U.S. PATENT DOCUMENTS 10,152,642 B2 * 12/2018 Chang ................... G06T 5/20
10,607,463 B2 * 3/2020 Pan ....................... G06F 40/40
(Continued)

FOREIGN PATENT DOCUMENTS

| EP | 3440833 B1 | 8/2019 |
|---|---|---|
| WO | 2019/145516 A1 | 8/2019 |
| WO | 2019/180033 A1 | 9/2019 |

OTHER PUBLICATIONS

"SoftMax Function", Wikipedia, Version Dated Jul. 7, 2020 (Year: 2020).*

(Continued)

*Primary Examiner* — Aaron W Carter
(74) *Attorney, Agent, or Firm* — Lerner David LLP

(57) ABSTRACT

A method to determine activity in a sequence of successively acquired images of a scene, comprises: acquiring the sequence of images; for each image in the sequence of images, forming a feature block of features extracted from the image and determining image specific information including a weighting for the image; normalizing the determined weightings to form a normalized weighting for each image in the sequence of images; for each image in the sequence of images, combining the associated normalized weighting and associated feature block to form a weighted feature block; passing a combination of the weighted feature blocks through a predictive module to determine an activity in the sequence of images; and outputting a result comprising the determined activity in the sequence of images.

17 Claims, 8 Drawing Sheets

(51) Int. Cl.
 *G06F 18/22* (2023.01)
 *G06F 18/214* (2023.01)
 *G06F 18/2113* (2023.01)

(56) References Cited

U.S. PATENT DOCUMENTS

| | | | | |
|---|---|---|---|---|
| 10,684,681 | B2* | 6/2020 | Lemley | G06V 20/597 |
| 10,853,675 | B2* | 12/2020 | Wang | G06V 40/171 |
| 10,946,873 | B2* | 3/2021 | Deng | B60W 50/14 |
| 11,044,404 | B1* | 6/2021 | Persiantsev | H04N 5/232 |
| 11,222,198 | B2* | 1/2022 | Kwatra | A01K 5/02 |
| 2003/0026340 | A1* | 2/2003 | Divakaran | H04N 19/61 375/240.16 |
| 2003/0095602 | A1* | 5/2003 | Divakaran | H04N 19/46 375/240.16 |
| 2003/0220725 | A1* | 11/2003 | Harter, Jr. | B60K 35/00 701/36 |
| 2005/0220191 | A1* | 10/2005 | Choi | G06T 7/269 375/240.16 |
| 2006/0088191 | A1* | 4/2006 | Zhang | G06V 20/40 382/107 |
| 2010/0053480 | A1* | 3/2010 | Jaworski | B60R 11/0235 348/837 |
| 2014/0079297 | A1* | 3/2014 | Tadayon | G06K 9/00 382/118 |
| 2014/0093174 | A1* | 4/2014 | Zhang | G06V 20/35 382/190 |
| 2015/0186714 | A1* | 7/2015 | Ren | H04N 5/23229 348/77 |
| 2016/0055381 | A1* | 2/2016 | Adsumilli | G11B 27/13 386/241 |
| 2016/0101784 | A1* | 4/2016 | Olson | B60K 35/00 340/576 |
| 2017/0185846 | A1* | 6/2017 | Hwangbo | G06V 20/47 |
| 2017/0308756 | A1* | 10/2017 | Sigal | H04L 65/4069 |
| 2017/0351922 | A1* | 12/2017 | Campbell | G06V 20/47 |
| 2018/0239975 | A1* | 8/2018 | Tam | G06V 40/167 |
| 2019/0065873 | A1* | 2/2019 | Wang | G06V 20/597 |
| 2019/0138855 | A1* | 5/2019 | Sohn | G06V 10/40 |
| 2019/0163978 | A1* | 5/2019 | Yang | G06K 9/628 |
| 2020/0218959 | A1* | 7/2020 | Srinivasa | G06N 3/0481 |
| 2020/0226751 | A1* | 7/2020 | Jin | G06K 9/6256 |
| 2020/0302185 | A1* | 9/2020 | Hussein | G06V 10/426 |
| 2021/0004575 | A1* | 1/2021 | Pescaru | G06V 40/20 |
| 2021/0117659 | A1* | 4/2021 | Foroozan | G01S 13/58 |
| 2021/0158027 | A1* | 5/2021 | Kwatra | G06V 20/41 |
| 2021/0350121 | A1* | 11/2021 | Sridhar | A61B 5/002 |

OTHER PUBLICATIONS

XU et al., "Recurrent Convolutional Neural Network for Video Classification", IEEE, 2016 (Year: 2016).*
Cheron et al. "P-CNN: Pose-Based CNN Features for Action Recognition" (Year: 2015).*
J.C. Chen et al. , "Driver Behavior Analysis via Two-Stream Deep Convolutional Neural Network" Applied Sciences 2020, 10(6), p. 1908.
M. Granat, "How to Use Convolutional Neural Networks for Time Series Classification" published on https://towardsdatascience.com on Oct. 4, 2019.
L. Meng, et al., "Interpretable Spatio-Temporal Attention for Video Action Recognition" Jul. 3, 2019 International Conference on Computer Vision Workshop p. 1513, 10 pages.
K. Li et al.,.: "Tell Me Where to Look: Guided Attention Inference Network" Feb. 27, 2018, arXiv:1802.10171v1, 10 pages.
C. Posch, et al., "Retinomorphic event-based vision sensors: bioinspired cameras with spiking output", Proceedings of the IEEE, 102(10), 1470-1484, (2014).
C. Toca, et al.: U.S. Appl. No. 63/017,165, filed Apr. 29, 2020 titled:"IMAGE Processing System". Only Specification, Drawings, Abstract, Claims Considered.
C. Ryan, et al., U.S. Appl. No. 16/904,122, filed Jun. 17, 2020 titled: "Object Detection for Event Cameras". Only Specification, Drawings, Abstract, Claims Considered.
International Search Authority, European Patent Office: International Search Report and Written Opinion of International Application No. PCT/EP2021/066305 filed Jun. 16, 2021. ISR-WO dated Sep. 29, 2021, 14 pages.
Fernando Basura et al: "Weakly Supervised Gaussian Networks for Action Detection" 2020 IEEE Winter Conference on Applications of Computer Vision (WACV), IEEE, Mar. 1, 2020 (Mar. 1, 2020), pp. 526-535, XP033770913, DOI: 10.1109/WACV45572.2020. 9093263.
Nguyen Phuc et al: "Weakly Supervise Action Localization by Sparse Temporal Pooling Network", Eye In-Painting With Exemplar Generative Adverserial Networks [Online] Apr. 3, 2018 (Apr. 3, 2018), pp. 3752-6761, XP055842612, DOI: 10.1109/CVPR.2018. 00706 ISBN: 978-1-5386-6420-9.
Pilhyeon et al: "Background Suppression Network for Weakly-supervised Temporal Action Localization" Arxiv.org. Cornel University Library, 201 Olin Library Cornel University Ithaca, NY, 14853, Nov. 22, 2019 (Nov. 22, 2019).

* cited by examiner

METHODS AND SYSTEMS TO PREDICT ACTIVITY IN A SEQUENCE OF IMAGES

FIELD

The present invention relates to methods and systems to predict activity in a sequence of images. Methods to train the system are also disclosed.

BACKGROUND

A number of industrial applications use an imaging sensor to monitor a user. Often the data from such an imaging sensor is processed to determine an activity of the user. The determined activity can be recorded or used to make a system adapt or interact with the user in an appropriate manner. An example is a driver monitoring systems, DMS, in a vehicle that activates driving assistive functions if a driver-facing camera reveals the driver is engaged in distracting activities.

There are known techniques, using advanced image analysis and deep learning techniques, to determine the activity from data in an imaging sensor. However, it is still difficult to determine activity accurately and the determination can be erroneous in certain situations.

J. C. Chen et al. describe "*Driver Behavior Analysis via Two-Stream Deep Convolutional Neural Network*" in Applied Sciences 2020, 10(6), p 1908. In this article, a driver behavior analysis system is described that uses one spatial stream to extract the spatial features and one temporal stream to capture a driver's motion information. A fusion network is also described to integrate the spatial and temporal features to assist classification.

It is known to use convolution neural networks on time series data to concatenate the features for each time-step and to apply CNNs on the resulting concatenated sequence. An example of this teaching is the article titled "*How to Use Convolutional Neural Networks for Time Series Classification*" published by M. Granat on 5 Oct. 2019.

In the article "*Interpretable Spatio-Temporal Attention for Video Action Recognition*" in the 2019 International Conference on Computer Vision Workshop p 1513, L. Meng et al. proposes a spatial-temporal attention mechanism for video action recognition and a set of regularizers so that the attention mechanism attends to coherent regions in space and time.

In the article "*Tell Me Where to Look: Guided Attention Inference Network*" published in 2018, K. Li et al. proposes a framework that provides direct guidance on the attention map generated by a weakly supervised learning deep neural network to teach the network to generate more accurate and complete attention maps.

The present invention addresses at least some of the deficiencies in the prior art.

SUMMARY OF THE INVENTION

The present invention is defined by the independent claims. Further optional features are defined in the dependent claims.

In embodiments of the present invention, a weighting is determined for each image of a sequence of images before a determination of the activity in the sequence is performed. In many cases, selected images in the sequence will be more or less important in revealing the activity occurring in the sequence than other images in the sequences. Determining a weighting for each image in the sequence means any variation in image importance in revealing the activity occurring in the sequence can be taken into account. Effectively, an image specific analysis is performed to make the analysis of the sequence easier or more accurate.

The image specific information may also be used as a source of information to validate or update the determination of the activity in a sequence of images.

Embodiments of the present invention may use a machine learning module that has been trained using a dual constraint loss function. Such a loss function enables training using the difference in labelled activity of each training image of a training sequence to predicted activity for the training image, and the difference in labelled activity of the training sequence to predict activity for the training sequence. Training in this way means the machine learning module assesses the quality of the information in each image as well as the quality of the prediction for the sequence of images.

BRIEF DESCRIPTION OF THE DRAWINGS

Embodiments of the invention will now be described, by way of example, with reference to the accompanying drawings, in which.

DESCRIPTION OF EMBODIMENTS

Embodiments of the present invention will now be described by reference to the above-referenced figures.

Figure 1:
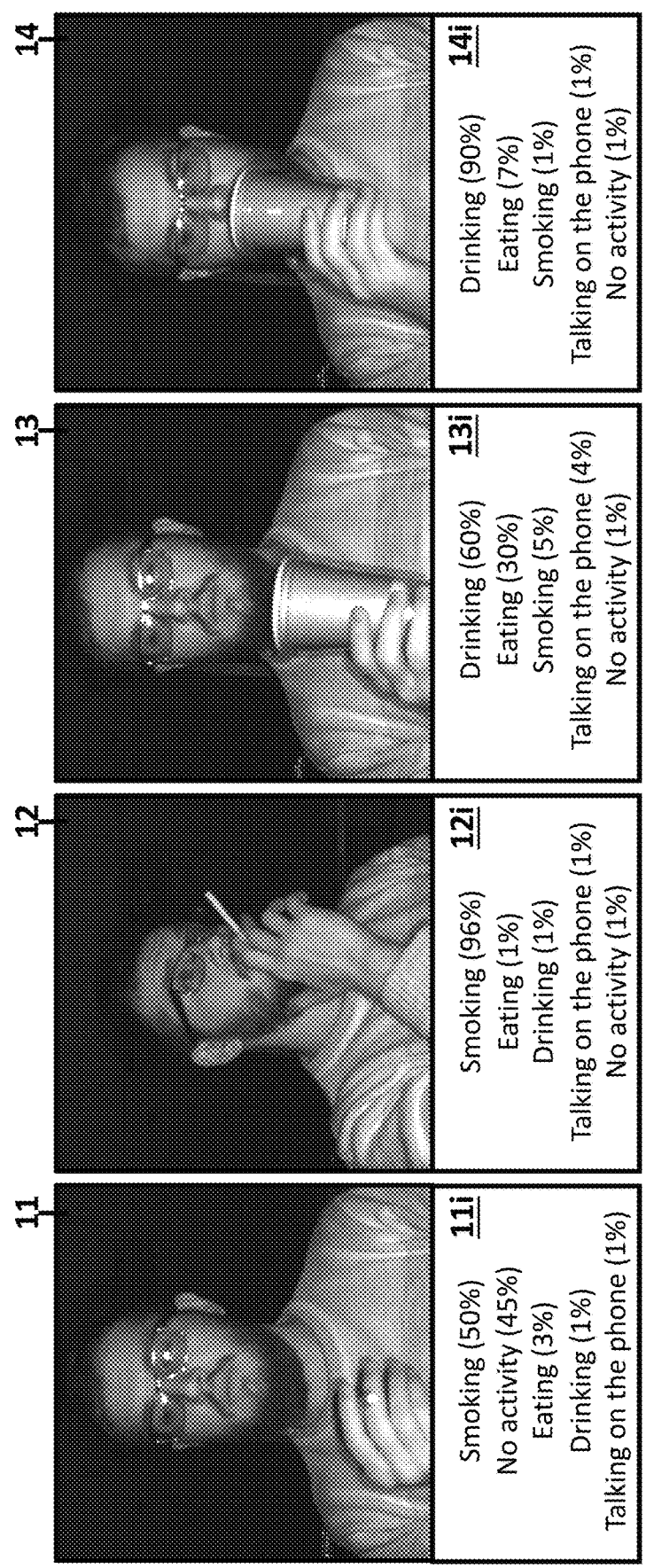
FIG. 1 shows images from a camera and their associated determined likelihoods for predetermined activities.

In FIG. 1, four images 11, 12, 13, 14 from a user-facing camera are shown. The camera images have been processed with a prediction module. The prediction module determines associated information 11*i*, 12*i*, 13*i*, 14*i* for each processing image. The associated information comprises determined likelihoods of predetermined activities occurring in a processed image. The predetermined activities comprise a set with a predetermined number of activities. In FIG. 1, the predetermined activities are: "smoking"; "eating"; "drinking"; "talking on the phone"; and "no activity". For each processed image, the activity with the highest determined likelihood is determined to be the activity occurring in the processed image. As examples, from analysis of the associated information images 11 and 12 have been determined to show smoking, whereas images 13 and 14 have been determined to show drinking.

It will be appreciated that the term activity includes any uniquely identifiable behavior pattern presenting temporal correlation, for example, falling asleep or a certain pattern of sudden sickness.

The sensitivity of the user-facing cameras used in embodiments of the present invention need not be limited to any specific range of wavelengths, but most commonly will be sensitive to near infra-red, NIR, light and/or visible, RGB, light. In some embodiments, RGB or intensity image information is provided directly from the camera image sensor, whereas in other embodiments, an event camera of the type disclosed in in Posch, C, Serrano-Gotarredona, T., Linares-Barranco, B., & Delbruck, T. "Retinomorphic event-based vision sensors: bioinspired cameras with spiking output", Proceedings of the IEEE, 102(10), 1470-1484, (2014), European Patent No. EP3440833, PCT Application WO2019/145516 and PCT Application WO2019/180033 from Prophesee can be employed and image information can be generated from event information provided by the camera, as disclosed in U.S. patent application Ser. No. 16/904,122 filed on 17 Jun. 2020 entitled "Object Detection for Event Cameras", (Ref: FN-662-US), the disclosure of which is herein incorporated by reference. The user-facing camera will generally be in the form of a camera module comprising a housing for a lens and a sensor, the lens serving to focus light onto the sensor. The camera module may also have electronics to power the sensor and enable communication with the sensor. The camera module may also comprise electronics to process acquired images. The processing can be low level image signal processing, for example, gain control, exposure control, colour balance, denoise, etc. and/or it can involve more powerful processing for example, for computer vision.

Some embodiments of the present invention are used in a driver monitoring systems, DMS. The user-facing cameras in these systems are typically configured to communicate data along a vehicle system bus (BUS), for example, a controller area network (CAN) bus. Data from other electronic components, such as additional cameras, may also be transmitted to the DMS along the BUS. In other embodiments, the DMS can be a separate system that can transfer and record data independently of the BUS.

Embodiments of the present invention predict activity not just in a single still image but images in a stream of images being acquired in real time. Thus, as well as having access to a given image, embodiments can access a sliding window sequence of previously acquired images which can help to inform the prediction of the activity in a given image.

Figure 2:
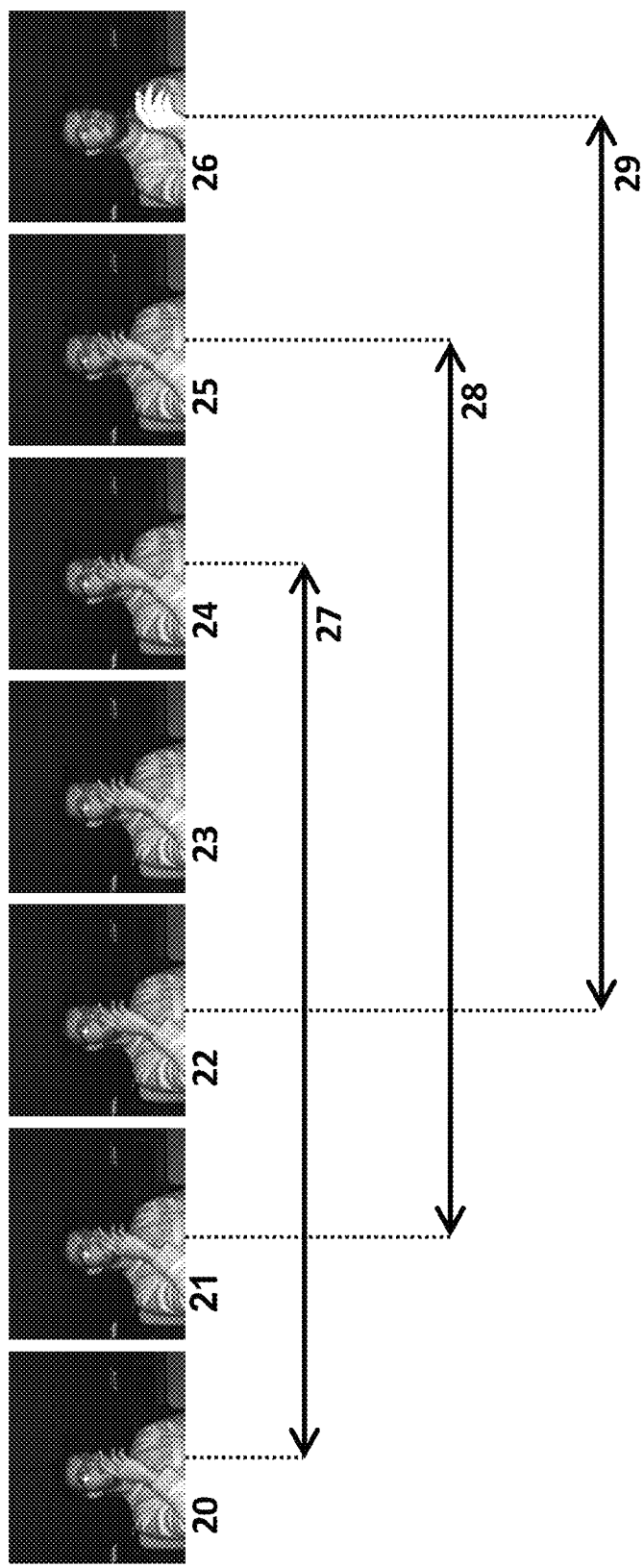
FIG. 2 shows a sequence of seven images comprising three sequences of five images.

By using a sequence of images, the confidence in the determined activity can be higher. As an example, FIG. 2 shows a sequence of seven images. Images 20-25 clearly shows a user smoking. Whether the user is smoking is unclear in image 26 due the hand of the user being close to the camera and far from the user's mouth. If the user activity is determined only from image 26 the determination would be difficult, and the result may not be smoking. However, if the user activity is determined from the sequence of seven images the determination of smoking would be relatively straight forward.

Embodiments of the present invention use a prediction module that can take any sequence with any number of images. In the example, sequential sequences of five images are processed. There are three such sequences shown in FIG. 2. The first sequence 27 runs from image 20 to image 24. The second sequence 28 runs from image 21 to image 25. The third sequence 29 running from image 22 to image 26.

Figure 3:
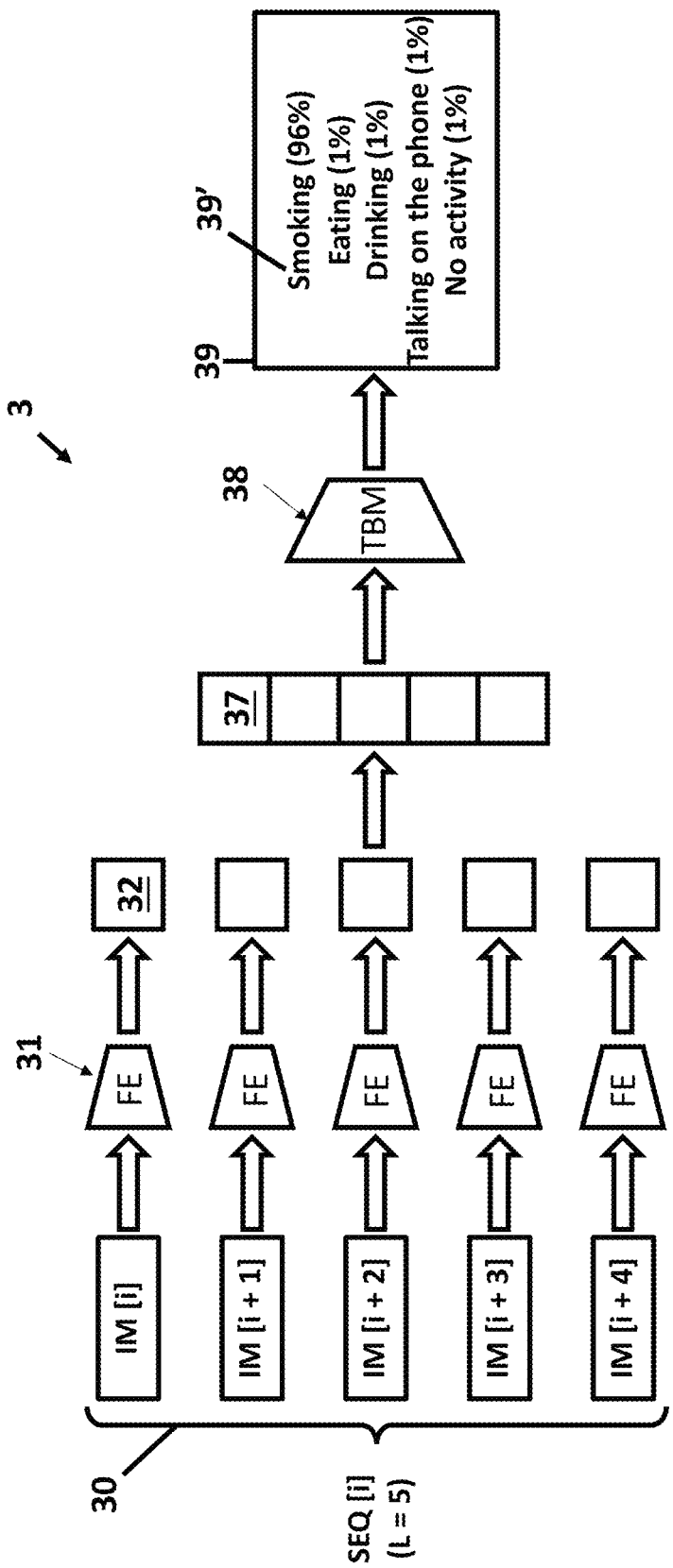
FIG. 3 shows a prediction module for determining the activity shown in a sequence of images.

A configuration of a prediction module 3 is shown in FIG. 3. In a first step, a sequence 30 of five sequential images (IM[i] to IM[i+4]) is passed to the prediction module. The images are first conditioned by cropping and/or resampling to a preferred format, such as an image that has dimensions 98×98. Each input image is then processed in a respective feature extraction module, FE, 31 to extract i.e. encode features from the processed input image. Each FE comprises a convolution neural network, CNN, with convolution, batch normalization and pooling layers. The output of the FEs are five feature blocks 32. In some embodiments, each feature block is a vector that has dimensions 16×48×48. Up to this stage in processing the processing is image specific i.e. it has only involved independent spatial analysis of the input images.

In the example, the five feature blocks are concatenated into a concatenated block 37 that has dimensions 5×16×48×48. However, it will be appreciated that techniques other than concatenation can be used to combine the feature blocks including multiplication, convolution or aggregation. In any case, the concatenated block 37 is then processed with a time-based module, TBM, 38. The TBM performs temporal analysis of the input images. The TBM 38 comprises a CNN with convolution, batch normalization, pooling layers and one or more fully connected layers with a final fully connected layer comprising 5 nodes, each for a respective activity. The output of the TBM can be normalized by a SoftMax process to produce the sequence associated information 39. The sequence associated information 39 provides the likelihoods of each activity of the predetermined activities occurring in the processed sequence of images 30.

The most likely sequence activity 39' in the sequence associated information 39 represents the most likely activity in the processed sequence of images 30. The most likely sequence activity 39' may be displayed to the user, recorded, or passed to another system for processing and/or recording.

The FE processes each image of the sequence of images 30 independently. Any length of sequence of images may be processed provided the resultant feature blocks when concatenated are of a manageable size for the TBM. Longer sequences may improve the confidence in the determined activity provided the length of the sequence does not extend past the end of the activity. However, by using shorter sequences, e.g. sequences of 4, 5, 6 or 7 images, the processing demands will be reduced allowing the prediction module to operate using less energy and/or operating with a reduced latency.

In some embodiments, the images are not processed in parallel. For example, a single FE can be used to process one input image into a feature block, store the produced feature block, and then proceed to process another image. This process can be repeated until all the required input images have been processed. The stored feature block can then be concatenated and processed as described above.

In some applications, such as processing frames from a user-facing camera, the sequences of images to be processed are typically sequentially streamed to the prediction module. In such applications, the prediction module can use the intermediate results from a previous instance of FE processing to reduce the processing required. So for example the output of FE processing of frame IM[i] is available for use as the output of processing of frame IM[i+1] for processing a subsequent frame similar to the technique described in U.S. Patent Application No. 63/017,165 filed on 29 Apr.

2020 and entitled "Image Processing System", (Ref: FN-661-US) the disclosure of which is herein incorporated by reference.

As an example, consider FIGS. 2 and 3 and consider the processing of the second sequence 28 with the multi-class prediction module 3 after the first sequence 27 has been previously processed. During the processing of the first sequence 27, the FE 31 has produced feature blocks for images 20 to 24. By storing these feature blocks, the system can reuse these results when processing the second sequence 28. In this way, the processing of the second sequence only requires the FE 31 to process image 25 into a feature block. Effectively, a sliding window can be used to reuse previous processing and therefore minimize the energy and time taken to determine an activity from a sequence of images. The use of this sliding window technique also means the processing required to produce the blocks is independent of the length of the sequence of images.

In the processing of the concatenated blocks by the TBM, the information in the feature blocks is treated equivalently across the feature blocks. The prediction module 3 therefore treats each input image of a sequence of images as equivalent in importance when determining the activity in the sequence of images. However, this is not necessarily correct as often some images in a sequence of images are much stronger or weaker indicators of a sequence activity than others.

Figure 4:
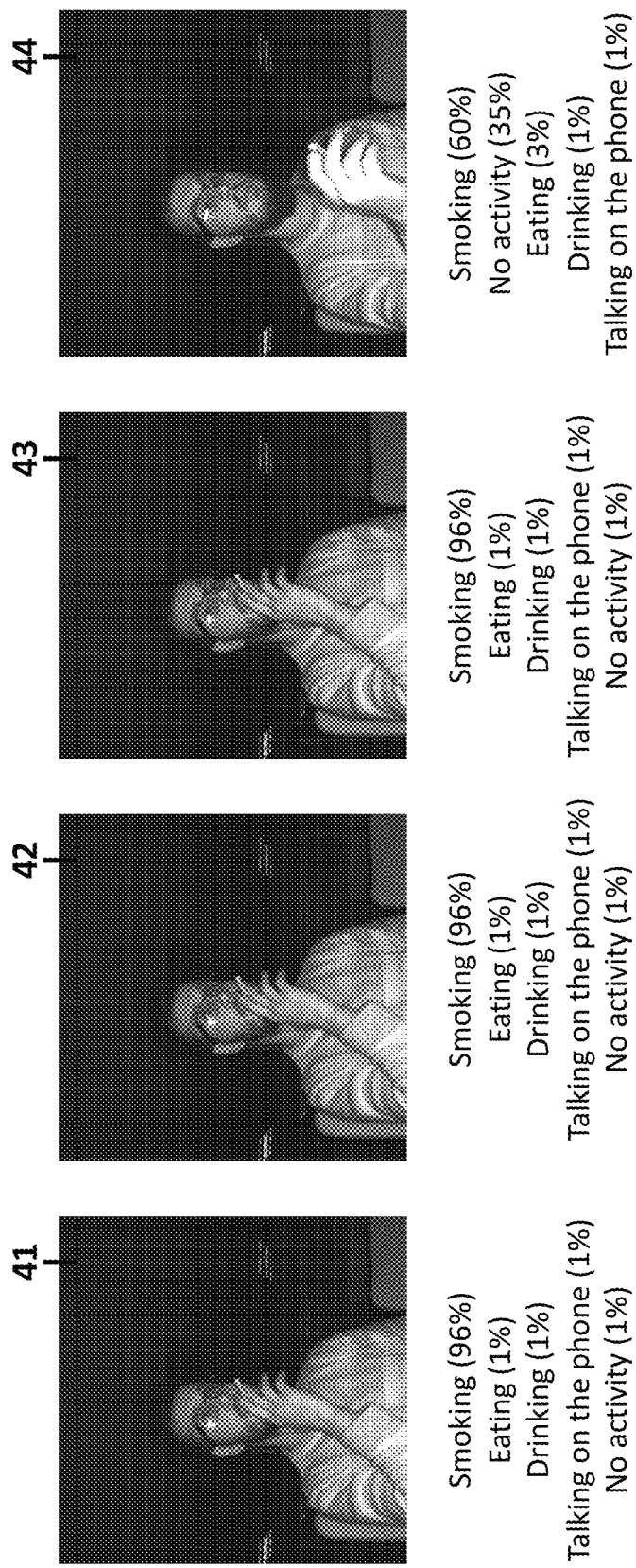
FIG. 4 shows images having the same most likely activity (smoking) and the likelihoods for predetermined activities associated with the images.

For example, in FIG. 4, images 41 to 43, which show a user holding a cigarette near a mouth, are good indicators of smoking. The smoking activity determination is high for images 41 to 43 as relevant target object are close together i.e. the target object of a cigarette is close to the target object of a mouth. Images 41 to 43 would therefore be highly relevant when determining if the user in the sequence of images shown in FIG. 4 is smoking. In contrast, in image 44, the cigarette is far from the user's mouth. Judged in isolation, image 44 may be considered to simply show a user holding a cigarette rather than smoking. The determination of the smoking activity in image 44 will therefore have a lower likelihood. When determining the activity of the user (smoking) in the sequence of images shown in FIG. 4, image 44 is therefore less important to the sequence determination than images 41 to 43. Therefore, even though each image in the sequence shown in FIG. 4 is determined to have the same activity, when determining the activity of this sequence, the images 41 to 43 are more important.

Figure 5:
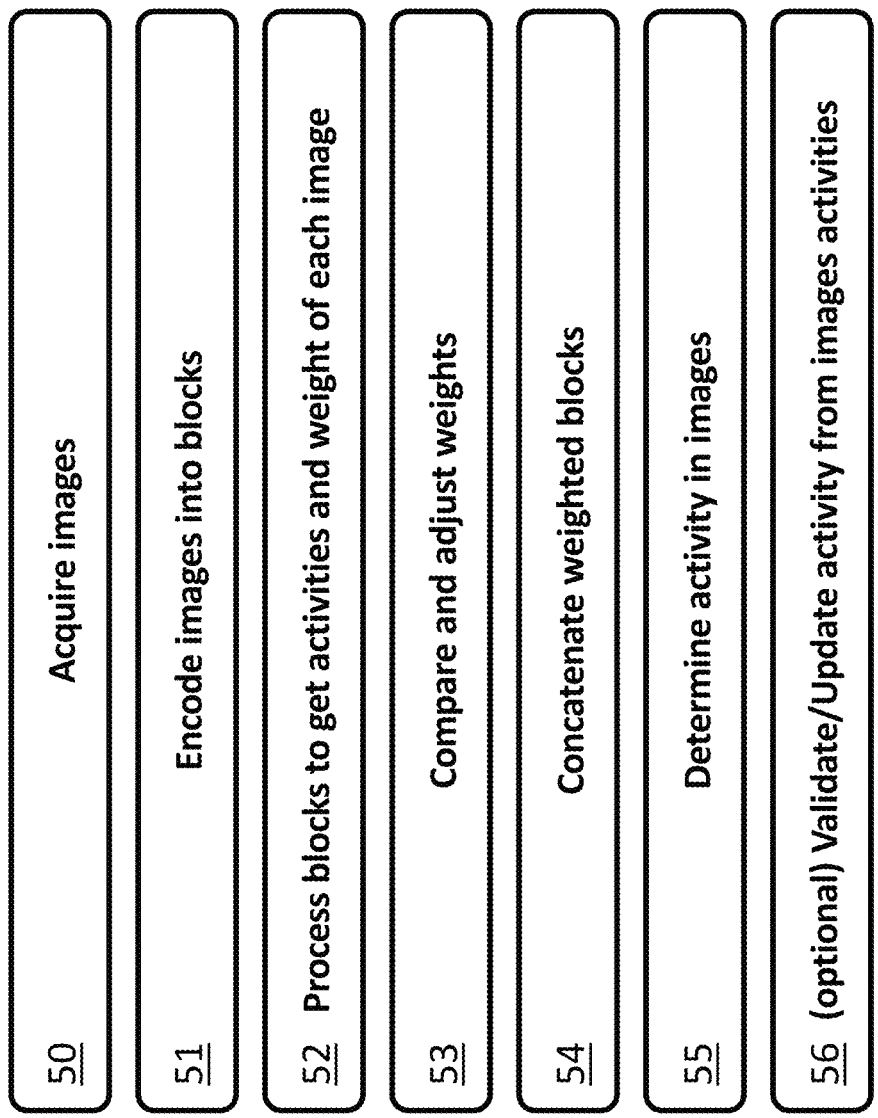
FIG. 5 shows a method to determine the activity shown in a sequence of images according to an embodiment of the present invention.

To account for the variation in the importance of images in a determination of the activity in a sequence of images, the prediction module 3 can be improved. The operation of the improved prediction module is explained in the steps shown in FIG. 5. In a first step 50, a sequence of images is acquired. In some embodiments, these images are a series of frames that are acquired from a user-facing camera of a DMS system. The acquired images are then processed with a FE to encode 51 the images into feature blocks. The determination of the feature blocks with the improved prediction module can be the same as the process the prediction module 3 shown in FIG. 3 uses to produce its feature blocks 32.

The feature blocks are then processed 52 to determine the likelihoods the predetermined activities for each feature block. As well as block specific activity likelihoods, a weighting is determined for the most likely activity for each block. The determined weighting is associated with the likelihood that the image indicates the most likely activity.

Using the images from FIG. 4 as an example, the weightings determined for images 41 to 43 may be 0.95 and the weighting determined for image 44 may be 0.6. The determined weightings are however an indication of image importance and need not correspond to other measurements. In other words, the determined weightings may correspond to image specific activity likelihoods or they may take other values. The determined weightings are then compared 53 and adjusted to normalize the weightings. In some embodiments, a SoftMax process is used to process the determined weightings into normalized weightings.

Each of the normalized weightings is then combined with the associated feature block to form weighted blocks. The combination can be achieved by multiplication, concatenation, or any process that combines the information in the feature block with the associated normalized weighting.

In the embodiment, the normalized weighted blocks are then concatenated 54 in the order of the sequential images. However, it will be appreciated that in variations of the embodiment the normalized weighted blocks could be combined using other techniques including multiplication, convolution or aggregation. The concatenated weighted blocks are then processed 55 with a TBM to determine the likelihoods of predetermined activities in the sequence of image. The processing of the concatenated weighted blocks with the improved prediction module can be the same as the process the prediction module 3 shown in FIG. 3 uses to produce its associated information 39 from its concatenated blocks 37.

The activity with the highest likelihood of the determined likelihood is marked as the most likely sequence activity. The most likely sequence activity may be displayed to the user, recorded, or passed to another system for processing and/or recording.

In an optional step, the predetermined activities and weighting for at least one feature block are compared to the most likely sequence activity, to validate or trigger updating of most likely sequence activity, step 56. As an example, a most likely sequence activity is compared with the likelihood for the same activity determined from at least one feature block and a difference is taken to indicate that the most likely sequence activity has finished, is unusual in some manner, or that the user is about to transition to another activity. This comparison serves as a useful validation of the most likely sequence activity and may also trigger the updating or recalculation of the most likely sequence activity. The comparison therefore improves the confidence or accuracy in the activity determined for the sequence of images.

Figure 6:
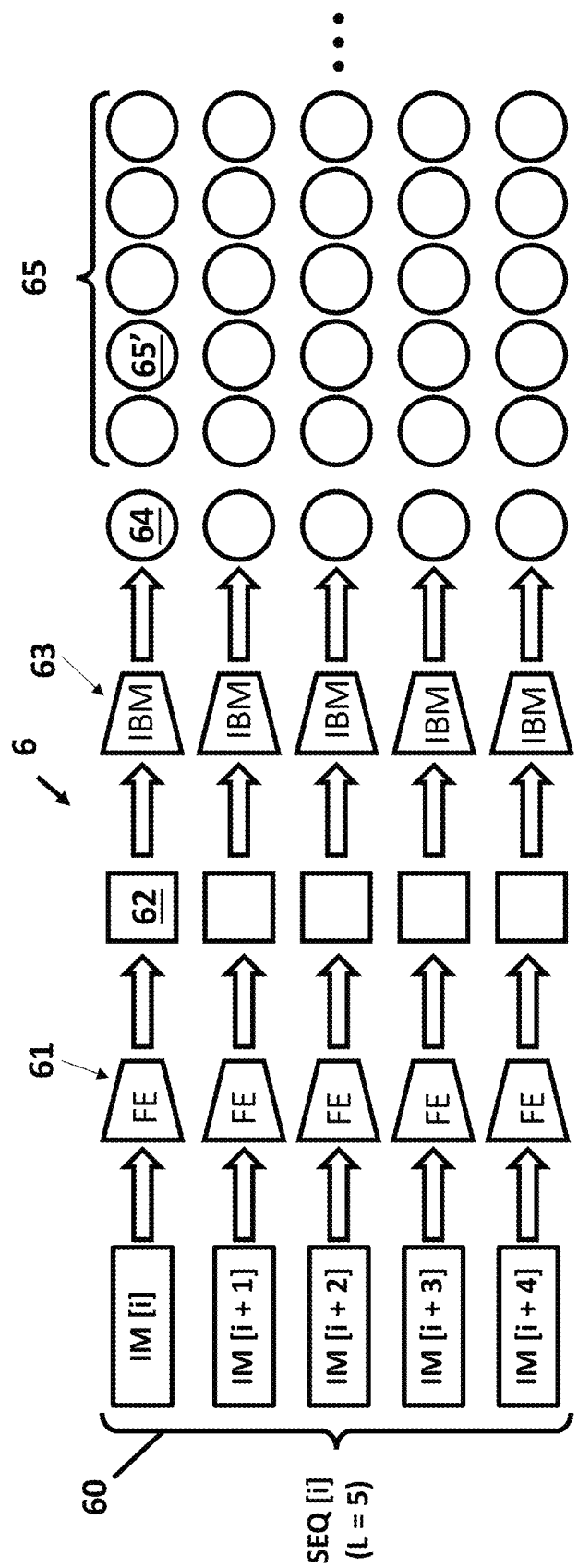
FIG. 6 shows a first part of an improved prediction module according to an embodiment of the present invention, this part determines the weighting and the likelihoods for predetermined activities for each image in a sequence of images.
Figure 7:
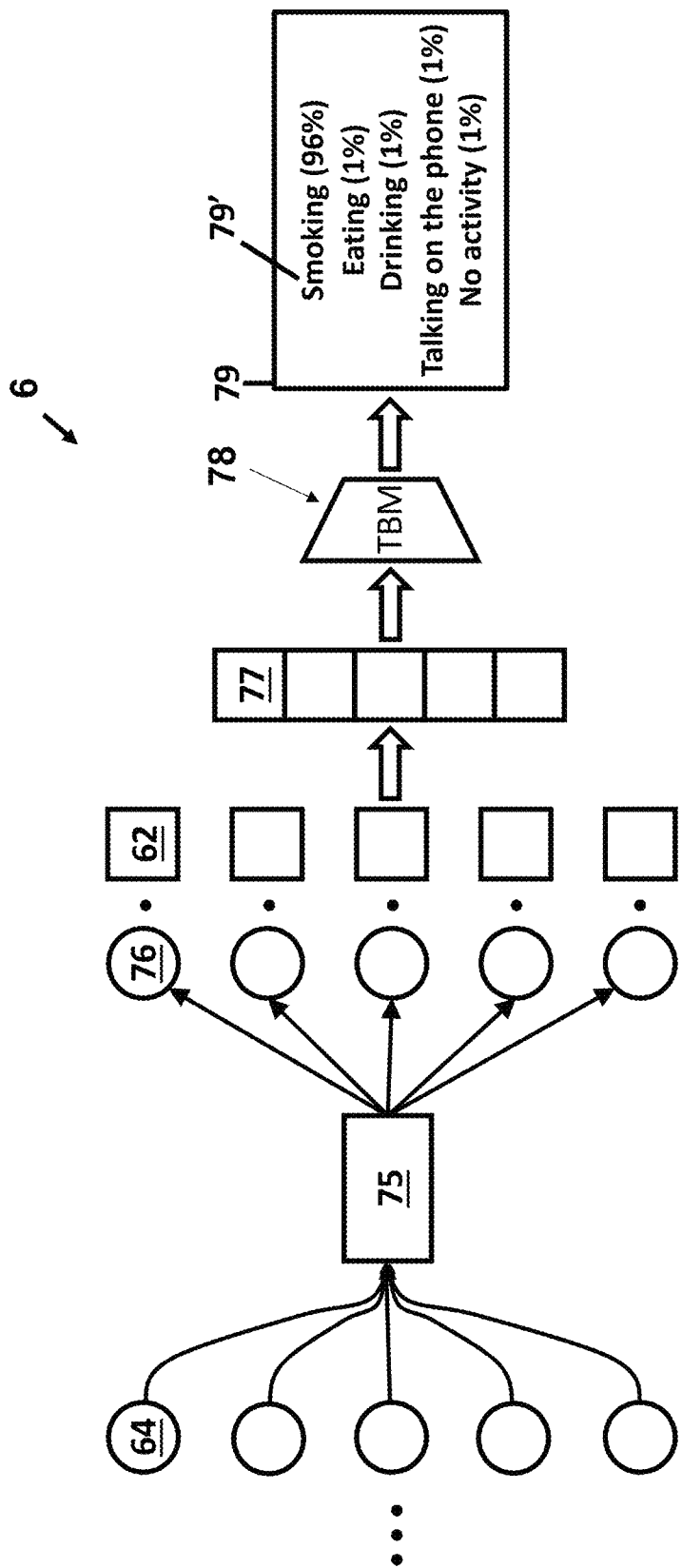
FIG. 7 shows a second part of the improved prediction module, this part determines the most likely activity shown in the sequence of images.

Two parts of an improved prediction module 6 are shown in FIGS. 6 and 7. In FIG. 6, the feature blocks 62 are produced by processing input images of a sequence 60 with respective FEs 61. The feature blocks can be produced in the same way as described above. Each feature block 62 is then processed with an image-based module, IBM 63. The IBM 63 comprises a CNN containing convolution, batch normalization, pooling layers and a final fully connected layer. The output of each IBM 63 is a weighting value 64 and the likelihoods of the predetermined activities 65. The IBM 63 forms its predictions based only on the processed feature block 62 and ultimately only from the image from which the FE formed the processed block 62. The IBM 63 does not take any temporal analysis into account i.e. the difference between images is ignored by the IBM 63. The IBM therefore helps to optimize the spatial analysis and ultimately to make later processing easier.

Again, each feature block 62 is processed independently by an IBM 63 but, in some embodiments, the blocks are not processed in parallel. For example, the feature blocks may in a serially processed in a single IBM 63. In other words, the sliding window technique described above can be used.

The output of the IBM 63 is the image specific information. The image specific information comprises likelihoods of the predetermined activities 65 and the weighting 64. The image specific information is specific to the input block 62, which is specific to an image of the input sequence of images 60 that formed the input block 62. The weighting 64 relates to the highest 65' of the likelihoods of the predetermined activities. Each weighting may be considered as representing a measure of how well a particular image represents the most likely image activity 65'.

After the processing in FIG. 6, each image will have image specific information comprising the likelihoods of the predetermined activities 65 including a most likely image activity 65', and a weighting 64 associated with the most likely image activity 65'.

The processing in FIG. 7 starts with the weightings 64 produced by the process shown in FIG. 6. The weightings 64 are normalized using a SoftMax process 75 to produce normalized weightings 76. The feature blocks 62 are then multiplied by the corresponding normalized weighting 76. The weighted blocks are then combined, in this case using concatenation. The concatenated weighting blocks 77 are then processed with a TBM 78 to determine the likelihoods of predetermined activities in the sequence of image.

The processing of the concatenated weighted blocks 77 by a TBM 78 in the improved prediction module 6 occurs in a similar manner to the processing of concatenated blocks 37 by the TBM 38 of the prediction module 3. Specifically, the output of the TBM 78 is normalized by a SoftMax process to produce the sequence associated information 79. The sequence associated information 79 provides the likelihood of each activity of the predetermined activities occurring in the processed sequence of images 60. The activity with the highest determined likelihood is marked as the most likely sequence activity 79' in the processed sequence of images 60. The most likely sequence activity 79' may be displayed to the user, recorded, or passed to another system for processing and/or recording.

In an optional step, the image specific information 64+65 for at least one image is compared to the most likely sequence activity 79'. The result of this comparison can be used to validate or trigger an update or recalculation of the most likely sequence activity 79'.

If the most likely image activity 65' for the images in a sequence match the most likely sequence activity 79', this validates the most likely sequence activity 79'.

Alternatively, if the most likely image activity 65' for at least one image in a sequence differs from the most likely sequence activity, a further decision needs to be taken. An error or warning flag can be raised, or an "unknown activity" can be recorded as the most likely sequence activity. If the number of images with a most likely image activity differing from the most likely sequence activity is greater than half the sequence length, the most likely sequence activity may be updated. The most likely sequence activity may be updated to match the most likely image activity for the most recent image, or to the most common most likely image activity across all the image. Alternatively, the improved prediction module may repeat the determination of the most likely sequence activity.

In addition to, or as an alternative to, validating the most likely sequence activity 79', in some embodiments, the image specific information and/or most likely image activity 65' may be displayed, recorded and used in addition to the most likely sequence activity 79'. This is especially useful for fast acting or safety systems in vehicles, in which it is useful to know the most recently determined activity of the user alongside the activity determined over a recent period.

In some applications of embodiments of the present invention, the output of the most likely sequence activity 79' and/or the image specific information can be used to modify the function of other systems. For example, a vehicle may activate driver assistance functions because an improved prediction module indicates that the driver is currently drinking or talking on the phone. In another example, the vehicle may deactivate air flow if the car is cold and the improved multi-class prediction module indicates that the driver has just stopped smoking.

Figure 8:
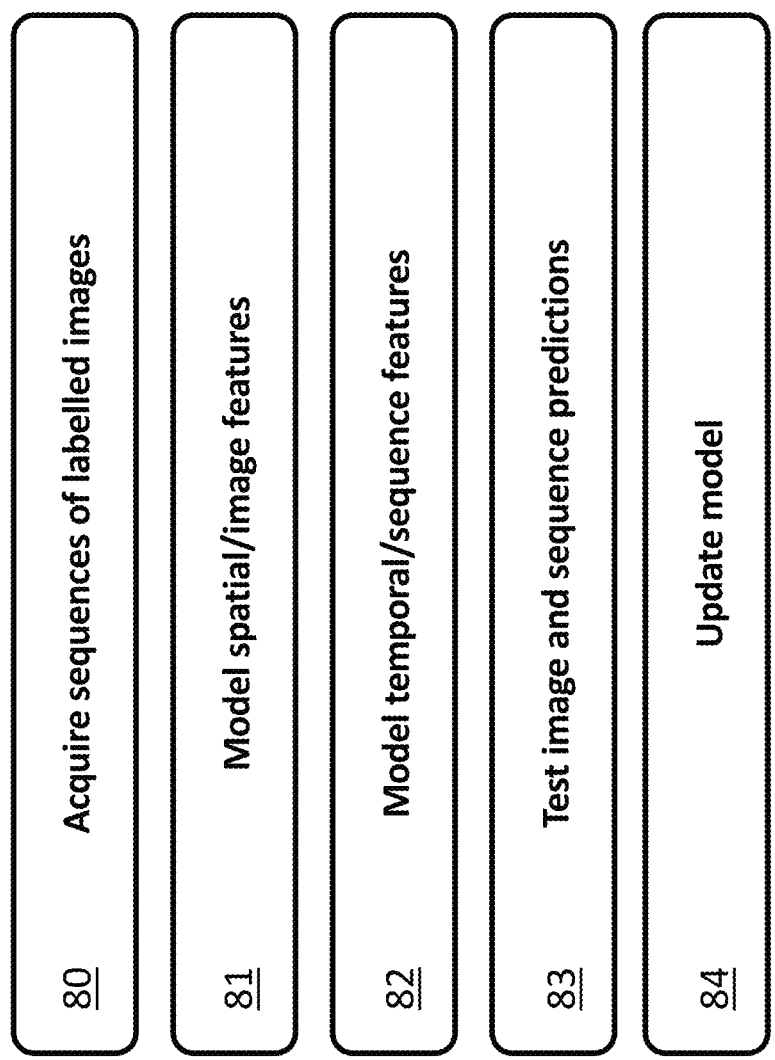
FIG. 8 shows a method to train a multi-class prediction module to determine the most likely activity shown in a sequence of images.

The improved prediction module 6 comprises a machine learning module. In some embodiments, this module is trained using the process shown in FIG. 8. The training process comprises acquiring 80 labelled training data. Typically, the labelled training data is in the form of a plurality of sequences of images, with each image in each sequence having a label that indicates the activity occurring in the image. The labels of the images serve as the source of truth for training the module 6. Labelled images may be obtained from real images that have been manually labelled and/or automatically labelled using a separate labelling system operating according to known methods. Labelled images may also comprise generated images that have been created by processing a labelled real image. For example, at least one labelled image may be processed into a sequence with additional images, with each additional image in the sequence being assigned a label derived from the labels of the at least one labelled image. The use of generated images helps reduce the number of labelled images that need to be acquired for training.

The improved prediction module is a predictive model that may be considered to comprise two models: a first model to model 81 spatial features and a second model to model 82 temporal features. The first model comprises the FE and the IBM components of the improved multi-class prediction module. The second model comprises the TBM of the improved prediction module 6.

The labelled trained data is processed with the improved prediction module to produce training results in the manner described above. The training results comprise image specific information and sequence associated information. The training results are then tested 83 against the labels of the training data. The difference between the image specific and sequence associated information and the respective labels of the training data is used to update the predictive model and thereby train the improved prediction module. The training therefore has two constraints: minimizing the difference between the labelled and predicted image specific information; and minimizing the difference between the labelled and predicted sequence associated information.

An example of a loss function that may be used in the training of the improved prediction module to update the FE, IBM and TBM components is:

$$\text{LOSS}[i] = \frac{1}{2}\bigg(CrossEntropy(TB_{GTR}[i], TB_{PRED}[i]) + \frac{1}{L}\sum_{j=0}^{L-1} CrossEntropy(FB_{GTR}[j], FB_{PRED}[j])\bigg),$$

where:

$TB_{GTR}[i]$ is the labelled activity for a training sequence i;

$TB_{PRED}[i]$ is the predicted activity for a training sequence i;

$FB_{GTR}[j]$ is the ground-truth activity class for image j; and $FB_{PRED}[j]$ is the predicted activity class for image j.

Training in this manner is advantageous as it ensures the FE and the IBM are well optimized using the image specific information. The optimized FE and IBM produce accurate weightings reflecting the importance of the images in a sequence to the determination of the activity in the sequence. As these accurate weightings are input to the TBM, this means the optimization of the TBM no longer has to try and account for the variation in importance in input data itself. Consequently, the TBM is easier to optimize.

As the FE and the IBM are optimized using the image specific information, this training method also helps isolate the predictions of the most likely image activity from the most likely sequence activity. This isolation means the most likely sequence activity for a sequence is less likely to be biased in the same way as the most likely image activity for images from the sequence. This helps ensure that the validation of the most likely sequence activity for a sequence using the most likely image activity for images from the sequence is a robust validation.

While the above embodiment has been described in terms of determining an activity of a user in a scene, it will be appreciated that in variations of the disclosed embodiment, any activity which might be occurring in a scene may be determined.

In the embodiment, a percentage likelihood for an activity is provided by the predictive models (IBM 63 and TBM 78) for each image and for each sequence of images. This can be more or less granular as required. So, for example, the final output 79' of the module can be a simple indication of a single predicted activity at any given time. Alternatively, the predictive models (IBM 63 and TBM 78) may also determine the likelihoods of a plurality of predetermined confidences for that activity (e.g. High confidence, Medium confidence, Low confidence, Uncertain confidence).

The invention claimed is:

1. A method to determine activity in a sequence of successively acquired images of a scene, comprising:
   acquiring the sequence of images;
   forming, for each image in the sequence of images, a feature block of features extracted from the image;
   determining, for each image in the sequence of images, image specific information, wherein the image specific information includes a weighting indicating Image importance for the image and one or more likelihoods of one or more activities;
   normalizing, for each image in the sequence of images, the weighting to form a normalized weighting;
   combining, for each image in the sequence of images, the normalized weighting and feature block to form a weighted feature block;
   passing a plurality of weighted feature blocks through a predictive module to determine an activity in the sequence of images;
   comparing the determined activities with a most likely image activity in the image specific information;
   validating the determined activity based on the comparison; and
   outputting a result comprising the validated activity in the sequence of images.

2. The method of claim 1, wherein determining image specific information comprises:
   determining respective likelihoods of a plurality of predetermined activities occurring in the image, and the weighting for the image relates to the highest of the determined likelihoods of the plurality of predetermined activities.

3. A method to determine activity in a sequence of successively acquired images of a scene, comprising:
   acquiring the sequence of images;
   forming, for each image in the sequence of images, a feature block of features extracted from the image;
   determining, for each image in the sequence of images, image specific information, wherein the image specific information includes a weighting indicating Image importance for the image and one or more likelihoods of one or more activities;
   storing the formed feature blocks and the determined image specific information, wherein forming the feature block of features extracted from the image and determining the image specific information comprises retrieving a previously determined feature block and image specific information for the image;
   normalizing, for each image in the sequence of images, the weighting to form a normalized weighting;
   combining, for each image in the sequence of images, the normalized weighting and feature block to form a weighted feature block;
   passing a plurality of weighted feature blocks through a predictive module to determine an activity in the sequence of images; and
   outputting a result comprising the determined activity in the sequence of images.

4. The method of claim 1, further comprises:
   triggering a further action based on the comparison.

5. The method of claim 4, wherein triggering the further action comprises at least one of:
   issuing a warning; and
   adjusting the determined activity to a warning or a default value.

6. The method of claim 4, wherein triggering the further action comprises:
   determining a number of disagreeing images based on identifying a set of compared images that reveal a difference in the comparison; and
   responsive to the number of disagreeing images being greater than half of the number of images in the sequence, outputting a updated activity in the sequence of images.

7. The method of claim 6, wherein outputting the updated activity in the sequence of images comprises:
   determining, based on the image specification specific information, the most likely image activity for each of the set of compared images is the same; and
   outputting the most likely image activity as the activity in the sequence of images.

8. The method of claim 2, wherein the result comprises the image specific information for at least one frame.

9. The method of claim 1, wherein forming the feature block of features extracted from the image and determining the image specific information comprises:
   passing each image in the sequence of images through a feature encoding convolutional neural network to form a plurality of feature blocks; and
   passing each feature block of the plurality of feature blocks through an image-based module comprising at least one fully connected layer.

10. The method of claim 1, wherein passing the plurality of weighted feature blocks through the predictive module comprises:
passing a concatenation of the weighted feature blocks through a time-based module comprising a convolutional neural network.

11. The method of claim 1, wherein normalizing the weighting to form the normalized weighting comprises passing the weighting through a SoftMax module.

12. A method for training a predictive module to determine activity in a sequence of successively acquired images of a scene, the method comprising:
a) acquiring a sequence of images of a scene labelled according to an activity in the scene;
b) processing the sequence including forming a feature block of features extracted from each image and determining image specific information including a weighting for the image and an activity prediction for the image;
c) normalizing the determined weightings to form a normalized weighting for each image in the sequence of images;
d) for each image in the sequence of images, combining the associated normalized weighting and associated feature block to form a weighted feature block;
e) passing a combination of the weighted feature blocks through a predictive module to determine an activity in the sequence of images;
f) for each image in the sequence, comparing the activity prediction for the image to the label for the image, and using the result of the comparison to improve the activity prediction for the image;
g) comparing the determined activity in the sequence of images to the label for the sequence and using the result of the comparison to improve the determination of the activity in the sequence of images; and
h) repeating steps a) to g) for successive sequences of images until a condition is met.

13. The method of claim 12 wherein the condition comprises either: each prediction being within a threshold value of a label value; or a set number of repetitions of steps a) to g) has been performed.

14. A camera system, comprising:
sensors;
memory; and
one or more processors configured to perform operations comprising:
acquiring a sequence of images;
forming, for individual images in the sequence of images, a feature block of features extracted from the image;
determining, for individual images in the sequence of images, image specific information, wherein the image specific information includes a weighting for the image and one or more likelihoods of one or more activities;
normalizing, for individual images in the sequence of images, the weighting to form a normalized weighting;
combining, for individual images in the sequence of images, the normalized weighting and feature block to form a weighted feature block;
passing a plurality of weighted feature blocks through a predictive module to determine an activity in the sequence of images;
comparing the determined activities with a most likely image activity in the image specific information;
validating the determined activity based on the comparison; and
outputting a result comprising the validated activity in the sequence of images.

15. The camera system of claim 14, further comprises a driver-facing camera configured to generate the sequence of images, wherein the predictive module configured to receive the sequence of images.

16. The camera system of claim 14, the operations further comprising:
causing a vehicle to modify a vehicular system according to the result.

17. The camera system of claim 14, wherein the predictive module is further configured to determine likelihoods of predetermined activities occurring in individual images in the sequence of images, and wherein the result comprises the determined activity in a sequence of images and the image specific information for at least one frame.

* * * * *